March 12, 1940.    R. D. EVANS    2,193,585
RECTIFIER CONNECTION FOR HIGH VOLTAGE DIRECT CURRENT CIRCUITS
Filed March 19, 1938    3 Sheets-Sheet 1

WITNESSES:

INVENTOR
Robert D. Evans.
BY
ATTORNEY

March 12, 1940. R. D. EVANS 2,193,585
RECTIFIER CONNECTION FOR HIGH VOLTAGE DIRECT CURRENT CIRCUITS
Filed March 19, 1938 3 Sheets-Sheet 2
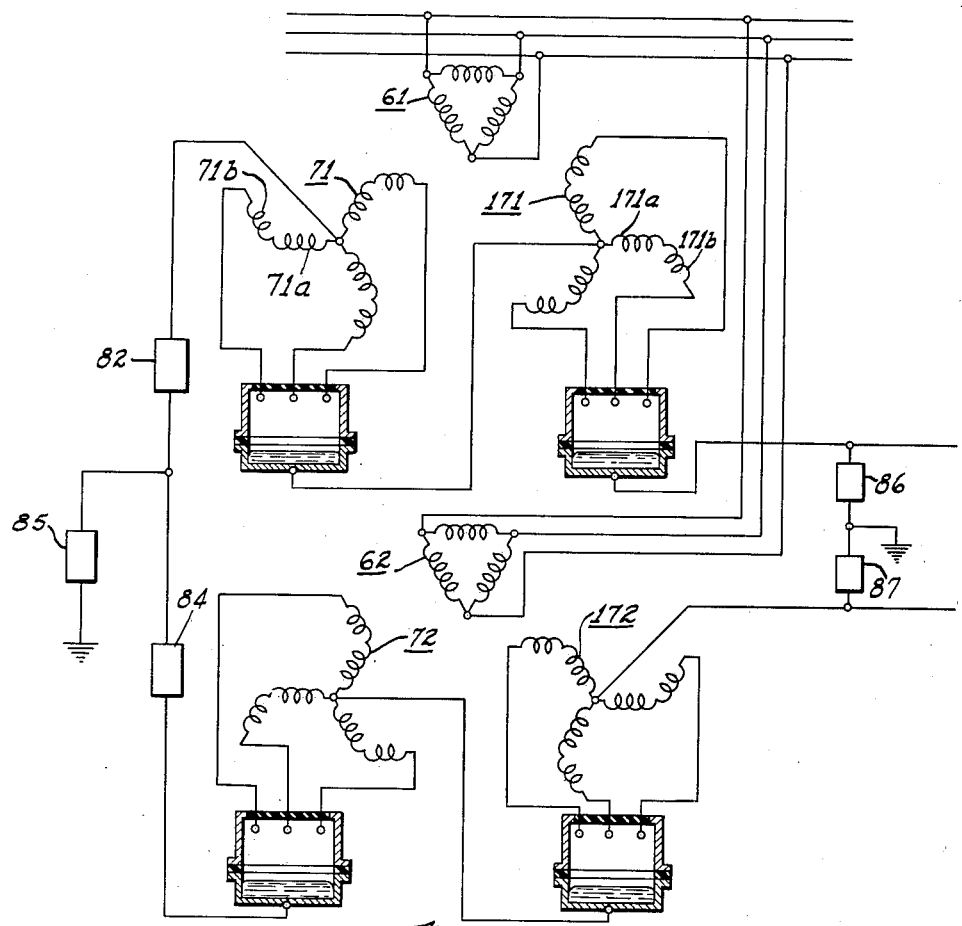
Fig. 3.
Fig. 4a.
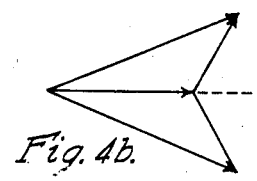
Fig. 4b.
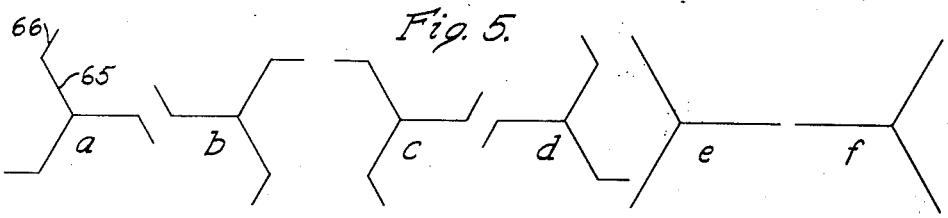
Fig. 5.
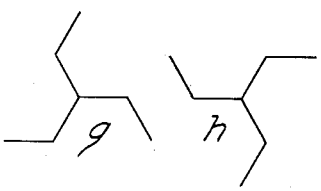
WITNESSES:
INVENTOR
Robert D. Evans.
BY
ATTORNEY

UNITED STATES PATENT OFFICE 2,193,585

RECTIFIER CONNECTION FOR HIGH VOLTAGE DIRECT CURRENT CIRCUITS

Robert D. Evans, Pittsburgh, Pa., assignor to Westinghouse Electric & Manufacturing Company, East Pittsburgh, Pa., a corporation of Pennsylvania Application March 19, 1938, Serial No. 196,930

8 Claims. (Cl. 175—363)

This invention relates to system connections for high-voltage direct current circuits.

One object of this invention is to provide a system of high-voltage rectifier circuit connections that will eliminate or substantially suppress the major troubleome harmonics.

Another object of the invention is to provide a system of connections for rectifiers or inverters, and transformer windings so that the total number of anodes shall be equal to the number of effective phases.

Still another object of the invention is to reduce to a minimum the number of dissimilar transformers required to provide high-voltage direct current when individual units are operated in series.

Still another object of the invention is to provide a high voltage rectification system in which several phase-displaced voltages are made available to establish an effective multi-phase system for the rectifying operations.

Other objects are to provide a system in which the high-voltage circuit connections are simplified; to simplify the arrangement of transformers in order to make that arrangement more reliable; and to utilize the smallest number of anodes for the required voltage and current capacities.

Another object of this invention is to provide a simple combination of generator winding connections and transformer connections for a high-voltage rectifier system to produce high voltage direct current substantially free of troublesome harmonics.

Another object of my invention is to introduce the principle of graded insulation for the individual elements of an interconnected system, to provide insulation to ground for the potential at which the auxiliary and grid control equipment for the rectifiers and inverters, may be disposed and to which they may be exposed.

By arranging the rectifying devices as disclosed herein, the insulation for the several devices may be diminished, and the resultant saving in cost renders this rectifying system more feasible and practical commercially.

In operation of dynamo-electric machinery for the generation of electrical forces, the usual current of the fundamental frequency is accompanied by forces of multiple frequency which are identified as the harmonics of the fundamental frequency, according to the numerical relationship of the harmonic frequency to the fundamental frequency.

In the conversion of electric energy from alternating current to direct current, the troublesome harmonics that are developed in A—C system are also transferred to the direct current system and these harmonics may effect communication circuits adjacent to circuits connected to either the A—C or D—C side of rectifiers and inverters.

In order to suppress such harmonics in the high-voltage direct current circuit, I have developed a system of circuit connections for high-voltage direct current rectification that will eliminate or substantially suppress the most troublesome harmonics. This same set of connections also minimizes harmonics in the A—C side of A—C to D—C, or D—C to A—C converter arrangements.

One arrangement whereby the advantages of my invention may be utilized consists in connecting the several windings of a generator in polyphase combinations or groups, with each group phase shifted with respect to the immediately adjacent groups. Thus, for example, the generator windings may be distributed to constitute four groups or combinations of three-phase windings, with each group shifted fifteen electrical degrees in phase relation from the subsequent groups.

Such arrangement of the generator windings provides an effective 12-phase system for rectification.

Each 3-phase group of the generator windings is connected to a primary delta winding of a step-up transformer. Each transformer is provided with a double star secondary, the corresponding phase windings of which are reversely connected to their respective star sets. By means of such double secondary sets, with the reversely connected windings, the number of effective phases available for rectification is doubled to twenty-four phases.

In order to establish a symmetrical balanced system, the rectifier units are distributed with twelve phase connections between each line and ground, the mid-point of the system being grounded.

The advantages of this system are greater efficiency in the rectification operation due to the larger number of phases, and greater efficiency in the generator because the necessity for suppressing or short circuiting the harmonics in the generating equipment is obviated. A further advantage both in economy and in convenience results because this system of connections reduces to a minimum the number of dissimilar transformers required to provide the high voltages for the rectifiers.

Another system arrangement which utilizes the advantages of this invention involves an arrangement of transformers by means of which a similarly phase-displaced group of voltages is established to provide a large number of effective phases. In this arrangement, the delta primary winding of a transformer is energized from any suitable source and the secondary windings of the transformer are arranged in double-star sets, with zig-zag connections to establish the phase-displaced voltages desired to provide the multiple phases for rectification.

In still another arrangement, I have shown the manner in which the primary windings of a group of transformers may be arranged by zig-zag connections to provide the necesary phase displacements with equalized voltages to establish a multi-phase system for rectification. These arrangements show the various zig-zag connections to provide the desired voltages with the proper phase relationships between the voltages of the transformer primaries.

In each case, each star secondary may be connected to a three-anode rectifier with the several rectifiers connected in series in the usual manner. The rectifier units with their transformers are equally distributed in their connections between each line and the neutral line to provide a symmetrical balanced system. The connection between the rectifiers and the neutral point includes filter equipment for certain selected harmonics, and the connection between the neutral point and ground includes filters for other selected harmonics.

The several arrangements of connections previously referred to, illustrating how this invention may be utilized, are shown in the accompanying drawings, in which:

Fig. 3 is a simplified diagrammatic view of a second suggested arrangement of connections wherein the zig-zag transformer connections are employed;

Figs. 4a and 4b are vector diagrams showing the relations between voltages of the zig-zag connections to establish a desired phase-displacement from a basic voltage, in an arrangement where all the units of Figure 3 are connected in one line circuit on one side of the neutral point;

Figure 6:
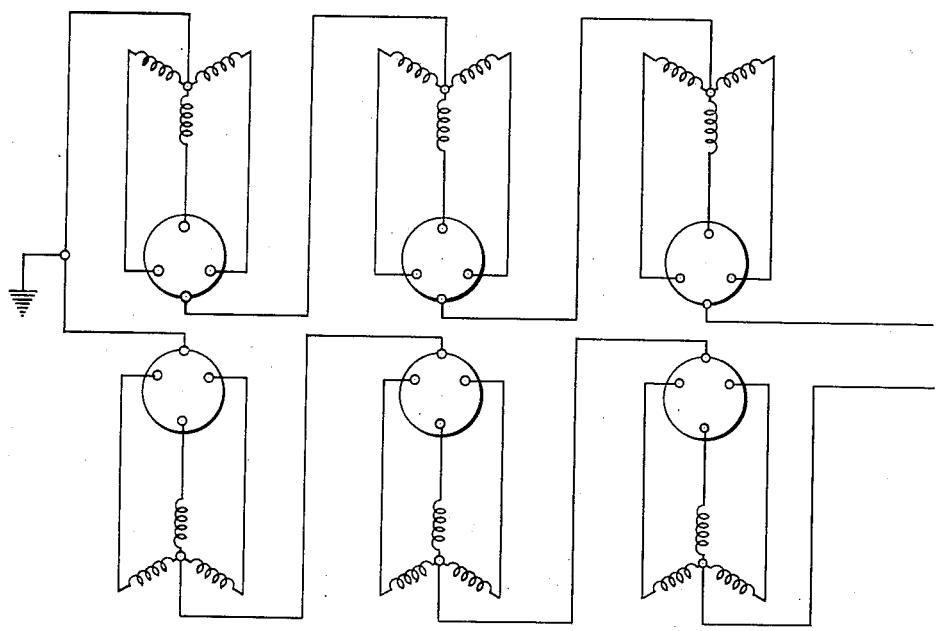
Figure 7:
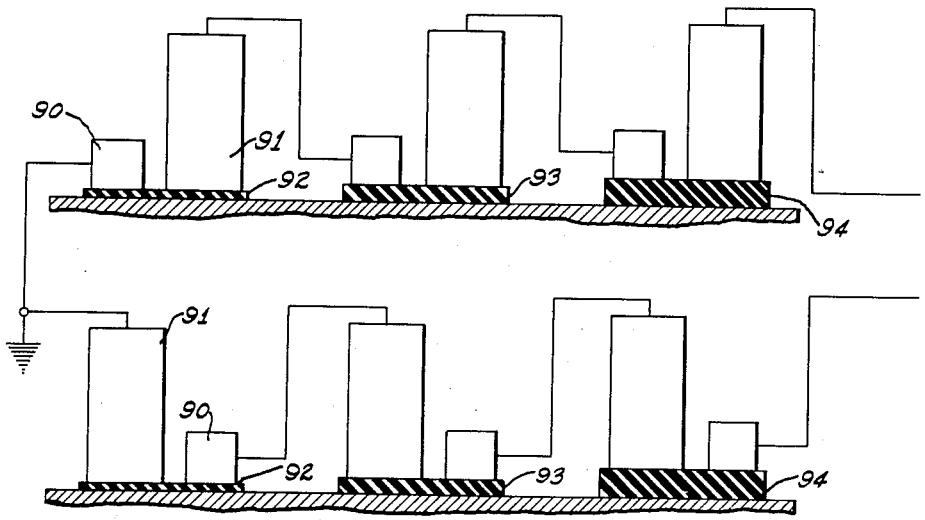

Fig. 5, items a to h, inclusive, illustrates several paired groups of transformer primary connections to establish the necessary phase displacements for 12 phases or for 24 phases for the rectifiers;

Fig. 6 is a schematic view of a system to which the principle of graded insulation is applied for the several units including a transformer rectifier and its auxiliary and grid control equipment; and Fig. 7 is a schematic view of the converter and transformer apparatus, as in Fig. 6, with the auxiliary control equipment therefor mounted on supports of graded insulating values.

Figure 1:
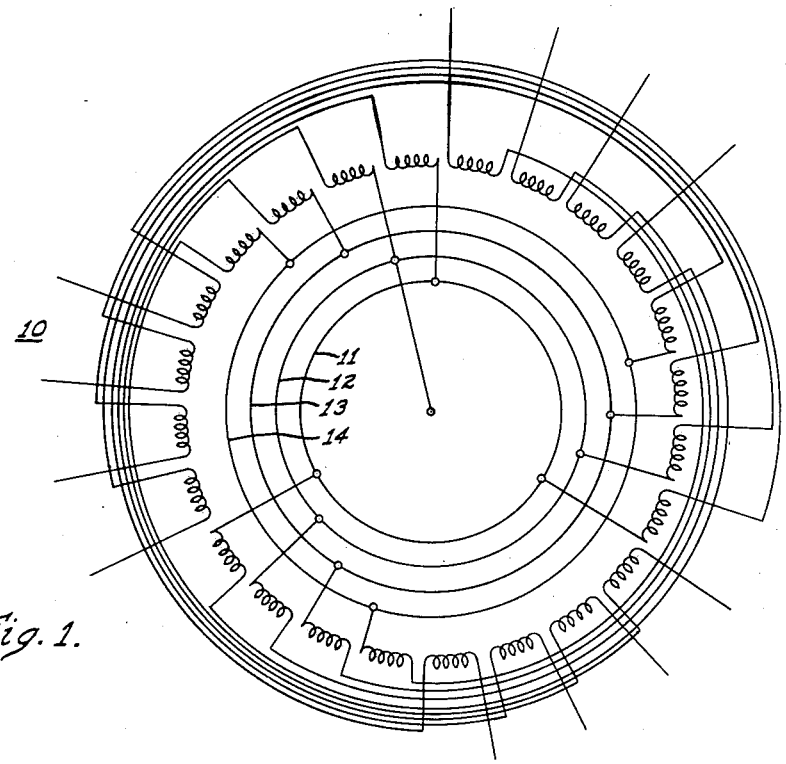
Figure 1 is a diagrammatic view illustrating the general arrangement and disposition of generator windings to provide the several polyphase groups.

As illustrated in Fig. 1 of the drawings, a generator 10 is illustrated with twenty-four windings arranged in four 3-phase groups 11, 12, 13 and 14, with each phase winding including two winding sections that are oppositely disposed mechanically, but electrically in phase. The star windings of each of the respective groups are joined by a connection indicated conveniently by the circles numbered to indicate the 3-phase groups. By means of the circuit arrangements illustrated, the twenty-four windings of the generator are paired and grouped to establish four 3-phase systems electrically displaced in phase to establish an effective 12-phase system.

Figure 2:
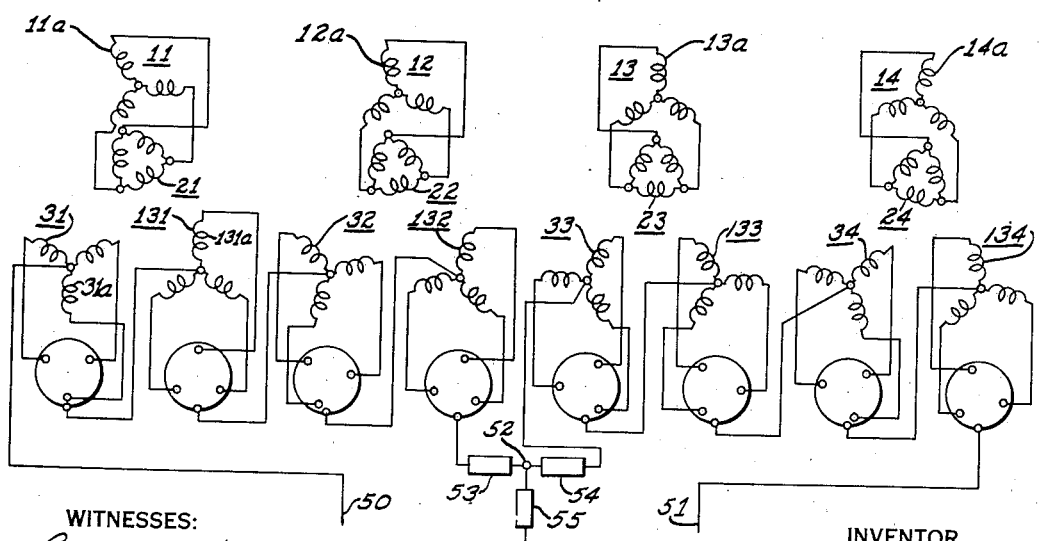
Fig. 2 is a diagrammatic view of the circuit connections between the several generator polyphase groups and the associated transformers and rectifier units, this system employing simple transformer circuit connections.

As we proceed now to consider Fig. 2, it will be observed that the four 3-phase groups of generator windings are illustrated as the four star connected windings 11, 12, 13 and 14, respectively. In order to illustrate the phase-shifted relationship between each of these groups, the star windings are illustrated as being physically angularly displaced with respect to each other, as, for example, the corresponding windings 11a, 12a, 13a and 14a of the respective groups are shown physically angularly displaced with respect to each other to indicate the electrical phase displacement.

Each star-connected generator group is connected to, and associated with, a delta primary winding 21, 22, 23 and 24, respectively, of an associated transformer. Each transformer is provided with double sets of star connected secondary windings. Transformer 21 is shown provided with secondary windings 31 and 131; transformer 22 with secondaries 32 and 132; transformer 23 with secondaries 33 and 133; and transformer 24 is shown provided with secondaries 34 and 134.

The disposition of the secondary windings in the star connections is also illustrated as being maintained in spaced-phase relationship, as controlled by the phase connections to the generator windings in the primary circuits. In addition, the corresponding phase winding of each set of paired star secondaries, as for example, winding 31a and 131a, is connected to the neutral point of its star group in a reversed sense relative to the other. This arrangement establishes an effective 24-phase rectifier between line-to-line terminals on the high-voltage circuit. Between each line and ground, however, there is an effective 12-phase connection which produces certain harmonics that must be blocked.

It should be recognized that a large number of alternatives or modifications of the basic scheme can be proposed. For example, by using a smaller number of three-phase groups and a correspondingly smaller number of delta double star transformers it would be possible to obtain a 12-phase connection. Similarly, the number of phase groups can be increased and 36 or more phases obtained.

For a given sub-division of the generator winding the maximum number of equivalent phases will be obtained when the number of phase groups is odd, thus the preferred number of phases would be 3, 4, 7, etc. The reason for this, of course, arises from the fact that, using an odd number base, a maximum number of phase positions is obtained for a given sub-division of the generator winding. However, it should be recognized that the preferred arrangement is to avoid a combination of phases such that the principal harmonic frequency of the rectifier is at the peak of the telephone influence factor (T. I. F.) weighting curve which is in the vicinity of 1080 cycles. For this reason, fourteen, eighteen and twenty-one phase combinations are probably less desirable than twelve or twenty-four phases.

In order further to establish a symmetrical system, an equal number of rectifiers are connected between the respective direct current lines 50 and 51 and the neutral point 52 to ground. Filtering equipment 53 and 54 will be disposed between each group of rectifiers and the neutral point 52, and filter 55 between the neutral point and ground.

With the circuit arrangements and connections shown in Figs. 1 and 2, it will be apparent that simple transformer connections may be employed, thus simplifying the design of the transformers and reducing the cost, as well as minimizing losses and permitting the use of transformers with identical characteristics and similar connections.

Another device to reduce the number of generator phases is to use two sets of transformers having different connections, as, for example, mesh connected and star connected groups. To illustrate this further, the arrangement of Fig. 1 could be obtained with two 3-phase groups fifteen degrees apart by the use of different types of transformer connections. With this scheme each generator group would supply a delta double-star group and a star double-star group with auxiliary delta. The second set of generator windings would have similar transformer connections. The effect of the four 3-phase generator groups fifteen degrees apart is thus obtained by the additional thirty degree shift difference between the star-star and delta star transformer connections.

Another alternative is to use delta and star connection of generator windings which produce in effect an additional group of phases displaced thirty degrees from the phase which would be obtained if the star connection were used. The difference in voltage can, of course, be compensated for by a corresponding change in the number of low voltage turns on the transformer.

Other alternatives include the possibility of using a different number of anodes per tank. The use of three anodes per tank has been shown in preference to a larger number because this reduces the total number of anodes between line and ground connections. Alternatives using a larger number of anodes per tank is, of course, obvious. Variation in the other direction is also possible since modifications suggest themselves in the use of one or two anode tank combinations.

Supply energy for the auxiliary equipment, to control the vacuum connection of the tanks and to control the grid excitation of the rectifiers and inverters, may be obtained from the secondaries of the associated transformers. The respective rectifiers or inverters and their associated auxiliary equipment will thus be subjected to the same potential to ground and may severally be mounted as units upon respective common insulating supports. Each unit and its support need be insulated only according to the potential of that unit to ground.

In view of the fact that the high voltage rectifiers will undoubtedly be located at generating stations, it is quite apparent that the generator and rectifier transformer combination can be designed as a unit. The system shown herein provides for simplified transformer connections with relatively little additional complication in the generating apparatus. Furthermore, since the disclosed arrangements employ three-phase groups with conventional delta-star transformers, the system retains the principal advantages of previously proposed systems utilizing three-phase generators and transformer connections to obtain the requisite number of transformer phases.

Filter equipment will be disposed in each line circuit between the apparatus and neutral point 83, and also in the connection from neutral point 83 to ground, being illustrated simply as elements 82, 84 and 85. Filter equipment 86 and 87 may also be disposed on the line side of the system as indicated.

In another modified arrangement, which is illustrated in Fig. 3, two primary transformer windings 61 and 62 are disposed to energize a pair of star-connected zig-zag secondaries 71 and 171 and 72 and 172, respectively.

Each main winding of the secondary star set 71, as for example 71a, is provided with a short phase-shifting winding 71b in order to provide a phase shift in the effective voltage of that leg of the star. Each other leg of the star winding 71 is similarly provided with a phase-shifting winding, so that the resultant effective three-phase system is angularly displaced with respect to the voltage system of the main windings of the star 71.

In the companion star set 171, the main phase winding 171a is provided with a phase-shifting winding 171b which is arranged to provide a voltage component equal and similar to that of winding 71b but in the opposite direction, so that the effective resultant voltage of the combined windings 171a and 171b will be opposite in effect to the resultant voltage of the combined windings 71a and 71b.

Each of the other windings of the star secondary 171 is similarly provided with a phase-shifting winding to establish a resultant effective voltage equal and opposite to that of the corresponding phase windings of the other secondary set 71.

The secondary windings 72 and 172 associated with the transformer primary winding 62 are similarly treated to provide a shift in the effective phase voltage of each of the windings of the star sets, so that the resultant effective three-phase voltages of secondary windings 72 and 172 will be shifted in phase from the resultant effective voltages of the secondary windings 71 and 171 connected in the other high voltage line.

The transformer secondary sets and their associated rectifiers are connected in series as indicated, and a filter or filter group 82 is connected between one rectifier group and the neutral point 83, and a similar filter group 84 is connected between the other rectifier group and the neutral point 83. A third filter group 85 is connected between the neutral point 83 and ground.

Other transformer winding arrangements and combinations may be made to effect the various angular or phase displacements necessary to establish the number of total phases desired.

As shown in Figures 4a and 4b the relationship between a main transformer winding 65 and a phase-displacing winding 66 may be determined from the vector triangles set up according to the angular displacement required for the number of phases desired.

Thus, phase-displacing winding 66 at an electrical angle of 120 degrees from main winding 65 should establish a voltage of such value that the resultant voltage, as shown by vector 67 would be phase-displaced from voltage of main winding 69 by half the angular displacement necessary between each of the total number of phases. For example, in a 24 phase system, the phase-displacement should be fifteen degrees between phases. Where a zig-zag connection is used, as in Figure 3, the phase-displacing angle of Figure 4a should be half fifteen degrees, or seven and one-half electrical degrees.

The foregoing discussion has been applied A—C to D—C conversion, but it is equally applicable to D—C to A—C conversion, since the cooperative arrangement of transformers and inverters is the same. The steps are the same except, of course, for the use of grids and their control equipment to control the operation of the inverters at the other end of the line to effect D—C to A—C conversion.

While for the sake of simplicity, I have not illustrated a grid control system for the rectifiers, I desire it to be understood that such rectifiers may be employed in the same manner as the inverters, according to present practice.

In the case of the inverters, and also where the rectifiers are provided with grids for controlling the current conduction, the auxiliary equipment for the rectifiers or inverters, and for the grids, may procure their potential and energy from the secondary windings of the associated transformers. Such a connection would be expensive where a single high voltage rectifier or inverter was used, because of the high voltage insulation that would be required between a rectifier and its auxiliary control equipment. Where, however, many units are connected in series, as here, less insulation is required between each unit and ground and is easily provided at less expense because the voltage across each unit is kept down. The amount of insulation for each unit is thus governed by its potential to ground, and such insulation may therefore be graded according to the distribution of such potentials.

In Figs. 6 and 7 I have illustrated in simple fashion, the principle of distributed insulation according to the potentials of the respective units.

In Fig. 6, the rectifier units are connected in series with the transformers. The usual control equipment is not illustrated.

In Fig. 7, the rectifier units and their associated control equipment, for maintaining the vacuum and for controlling the grid potentials, are represented by the smaller rectangles 90, and the transformers are represented by the larger rectangles 91. The insulation necessary for each combination unit is illustrated by the base rectangles 92, 93, and 94, and are shown of graded or stepped heights to indicate the greater insulating values for the units of higher potentials.

My invention is not limited to any specific arrangement of circuits or details, but may be variously modified without departing from the spirit and scope of the invention as set forth in the appended claims.

I claim as my invention:

1. In an electrical system for high voltage conversion, means for providing a plurality of symmetrical polyphase power sources, a pair of polyphase secondary windings energized by each of said power sources, each pair of secondary windings being shifted in phase from each other pair of secondary windings to establish a maximum number of effective phases for rectification, a rectifying device for each secondary winding including an anode for each phase of said winding to constitute a rectifying unit, the polyphase secondary windings being arranged in pairs and connected to have the corresponding phases of the paired secondary windings oppositely effective in the rectifying circuits, and means connecting the rectifying units in series.

2. A system as in claim 1, in which one or more pairs of polyphase secondary windings with their respective rectifiers is or are connected to be disposed between each line and a neutral ground connection.

3. A system as in claim 1, in which similar pairs of polyphase secondary windings and rectifier devices are connected between each line and a neutral ground connection.

4. In a high voltage electric conversion system, means for establishing a plurality of substantially independent polyphase power sources, independent transformer means associated with each of said power sources, each of said transformer means including a pair of polyphase secondary windings, a converting device for each secondary winding with an anode for each phase of said secondary winding to constitute a conversion unit, the polyphase secondary windings being arranged in pairs and connected to have the corresponding phases of the paired windings oppositely effective in the rectifying units, means connecting the conversion units in series, in which similar sets of polyphase windings and conversion devices are connected between each line and a neutral ground connection, with the sets shifted in phase to produce a balanced symmetrical system so far as the production of harmonics in the line circuit is concerned.

5. A system as in claim 4, plus harmonic filters between the neutral point and the rectifiers in each line, and filters between the neutral point and a ground connection.

6. A rectifier system comprising means for establishing a plurality of symmetrical polyphase power sources, said polyphase power sources having potentials shifted in phase with respect to each other, rectifying means for each polyphase power source, auxiliary means for controlling the condition of the rectifying means, means for connecting the rectifying means in series with half of the rectifying means in each line on opposite sides of a neutral ground connection, and graded insulating means between ground and the several rectifying means with their associated auxiliary control means.

7. In an electrical system, the combination with a plurality of transformers and associated rectifying devices, of means connecting the transformers and the devices in series in balanced arrangement on opposite sides of a grounded midpoint with the output potential of each of said transformers shifted in phase with respect to the phase of the output potential of the remaining transformers, and graded insulation between ground and each of the several transformer and rectifier combinations.

8. An electric current conversion system comprising an alternating current circuit, a high voltage direct current circuit, transformer means interconnecting said circuits, said transformer means including a plurality of independent windings arranged in pairs, said windings being arranged to produce terminal voltages which are displaced in phase relation with respect to each other, rectifying means for rectifying the terminal voltage of said windings and means for connecting said terminal voltages in series across said direct current circuit, a mid tap in said series connection and a ground connection connected to said mid tap.

ROBERT D. EVANS.